US009955199B2

(12) United States Patent
Watson et al.

(10) Patent No.: US 9,955,199 B2
(45) Date of Patent: Apr. 24, 2018

(54) TRANSFER OF CONSUMABLE DATA TO VEHICLES

(71) Applicant: PANASONIC AVIONICS CORPORATION, Lake Forest, CA (US)

(72) Inventors: Philip Watson, Lake Forest, CA (US); Christopher VandenBerg, Fullerton, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 255 days.

(21) Appl. No.: 14/807,612

(22) Filed: Jul. 23, 2015

(65) Prior Publication Data

US 2017/0026676 A1    Jan. 26, 2017

(51) Int. Cl.
*H04N 21/254*    (2011.01)
*H04H 20/62*    (2008.01)
(Continued)

(52) U.S. Cl.
CPC ........ *H04N 21/2541* (2013.01); *H04H 20/62* (2013.01); *H04L 9/083* (2013.01); *H04N 21/2146* (2013.01); *H04N 21/2225* (2013.01); *H04N 21/2347* (2013.01); *H04N 21/251* (2013.01); *H04N 21/254* (2013.01); *H04N 21/25808* (2013.01); *H04N 21/26613* (2013.01);
(Continued)

(58) Field of Classification Search
CPC ................ A01K 11/004; A01K 11/008; G06F 21/6218; G06F 21/78; G06K 19/0723; G06Q 10/08; G06Q 10/087; G06Q 30/02; H04H 20/62; H04L 9/083
See application file for complete search history.

(56) References Cited

U.S. PATENT DOCUMENTS

| 2005/0216938 A1* | 9/2005 | Brady, Jr. ......... H04L 29/06027 725/76 |
| 2015/0131513 A1* | 5/2015 | Lauer ..................... H04W 4/06 370/312 |
| 2015/0172354 A1* | 6/2015 | Coppola ............. H04L 65/4084 709/203 |

FOREIGN PATENT DOCUMENTS

| WO | WO2005120069 | 12/2005 |
| WO | WO2005120069 A2 | 12/2005 |
| WO | WO2005120069 A3 | 12/2005 |

OTHER PUBLICATIONS

European Patent Office, Extended Search Report, dated Nov. 28, 2016, 15 pages, Munich, Germany.

(Continued)

*Primary Examiner* — Abiy Getachew
(74) *Attorney, Agent, or Firm* — Stetina Brunda Garred & Brucker (57) ABSTRACT

Consumable data objects are transferred from a source server to a vehicle server. The availability of a first data communications link from the source server to a vehicle server is detected and a count of consumable data objects stored on the vehicle server is generated. If the first data communications link is detected, the count is transmitted to the source server over the link. An identifier of the vehicle server is derived from the first data communications link, and this identifier is associated with the count. A consumable data object replenishment count is generated based upon an evaluation of the count in relation to historic use data derived from past counts.

19 Claims, 5 Drawing Sheets

(51) Int. Cl.

| | |
|---|---|
| *H04N 21/214* | (2011.01) |
| *H04N 21/258* | (2011.01) |
| *H04N 21/266* | (2011.01) |
| *H04N 21/41* | (2011.01) |
| *H04N 21/426* | (2011.01) |
| *H04N 21/4363* | (2011.01) |
| *H04N 21/4405* | (2011.01) |
| *H04N 21/4627* | (2011.01) |
| *H04N 21/6334* | (2011.01) |
| *H04N 21/658* | (2011.01) |
| *H04L 9/08* | (2006.01) |
| *H04N 21/2225* | (2011.01) |
| *H04N 21/2347* | (2011.01) |
| *H04N 21/25* | (2011.01) |
| *H04N 21/2543* | (2011.01) |

(52) U.S. Cl.
CPC ... *H04N 21/4126* (2013.01); *H04N 21/42684* (2013.01); *H04N 21/43637* (2013.01); *H04N 21/4405* (2013.01); *H04N 21/4627* (2013.01); *H04N 21/63345* (2013.01); *H04N 21/6582* (2013.01); *H04N 21/2543* (2013.01)

(56) References Cited

OTHER PUBLICATIONS

Intertrust Technologies, ExpressPlay White Paper (data sheet/brochure), 2015, 5 pages, http://www.expressplay.com/inflight/.
European Patent Office, Communication Pursuant to Article 94(3) EPC, dated Jul. 31, 2017, 8 pages, Rijswijk, Netherlands.
European Patent Office, Summons to Attend Oral Proceedings, Jan. 1, 2018, 10 pages, Munich, Germany.

* cited by examiner

TRANSFER OF CONSUMABLE DATA TO VEHICLES

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to digital rights management as well as to data transfers to vehicle systems, and more particularly, to the distribution of cryptographic keys consumed in the playback of multimedia content through vehicle entertainment systems.

2. Related Art

Air travel typically involves journeys over extended distances that at the very least take several hours to complete. Some of the longer non-stop international flights have scheduled durations of over sixteen hours with travel distances extending beyond ten thousand miles. Passengers on board the aircraft are confined within an enclosed space of a designated seat for the entire duration of the flight, with only a few limited opportunities to leave the seat for use of the lavatory and so forth. Thus, even on the shortest trips an airline passenger has some idle time, which the passenger may occupy with work, leisure, and/or rest.

Airlines therefore provide on-board in-flight entertainment (IFE) systems that offer a wide variety of multimedia content for passenger enjoyment. Recently released movies are a popular viewing choice, as are television shows such as news programs, situation and stand-up comedies, documentaries, and so on. Useful information about the destination such as airport disembarking procedures, immigration and custom procedures and the like are also frequently presented. Audio-only programming is also available, typically comprised of playlists of songs fitting into a common theme or genre. Likewise, video-only content such as flight progress mapping, flight status displays, and so forth are available. Many in-flight entertainment systems also include video games that may be played by the passenger.

The specific installation may vary depending on service class, though in general, each passenger seat is equipped with a display device, an audio output modality, an input modality, and a terminal unit. The terminal unit may generate video and audio signals, receive inputs from the input modality, and execute pre-programmed instructions in response thereto. The display device is typically an LCD screen that is installed on the seatback of the row in front of the passenger, though in some cases it may be mounted to a bulkhead or retractable arm, or the like, that is in turn mounted to the passenger's seat. Furthermore, the audio output modality is a headphone jack, to which a headphone, either supplied by the airline or by the passenger, may be connected.

The multimedia content is encoded and stored as digital data on an on-board IFE content or media server that is remote the terminal unit. The terminal unit and the media server thus incorporate networking modalities such as Ethernet to establish data communications between each other. Once a particular selection of multimedia content is selected for playback by the passenger, the terminal unit retrieves the same, and a video decoder and an audio decoder function to generate the video and audio signals to the display device and the audio output modality, respectively, for presentation to the passenger.

Notwithstanding the availability of airline-installed IFE equipment such as the aforementioned seatback display screens and headphone jacks, an increasing number of passengers are choosing to bring on board their own portable electronic devices (PEDs) such as smart phones, media players, electronic readers, tablets, laptop computers, and so forth. In most cases, these devices are loaded with music, video, games, and other multimedia content of the user's choosing well before embarking. A variety of content distribution models exist, including per-item purchasing of individual songs, albums, movies, episodes, seasons, or other unit of multimedia content, rentals in which such items are accessible for a limited time (and at a correspondingly lower price), as well as subscription-based models in which a library of content is downloadable in exchange for the payment of a periodic fee.

Many content distribution services utilize digital rights management (DRM) technologies to restrict playback only to authorized users. The multimedia content is encrypted prior to distribution, and remains encrypted while stored on the user devices. Upon rendering payment or otherwise compensating the content distributor/owner, the user is provided with a decryption key that is utilized to decrypt the multimedia content for playback.

Although the purchase and loading of multimedia content onto PEDs have been greatly simplified, it is nevertheless a deliberate process that may require some effort in advance of a passenger's journey. New content may be downloaded via cellular networks and airport WiFi networks while still on the ground, but Internet connectivity may be limited or non-existent during flight. Thus, the passenger may not have the option to purchase content through conventional, Internet-based services.

One ready source of multimedia content is the on-board IFE system, and in more recent implementations, it is possible for PEDs to retrieve and playback content stored on the IFE content server via existing on-board WiFi networks. One commercially available wireless IFE system is Express-Play, and similar to conventional Internet-based services, the content delivered via this service is protected with DRM. Accordingly, a standard deployment includes a DRM license server (which is an implementation of the Marlin DRM platform), along with a device provisioning server and the aforementioned media server.

The Marlin DRM platform requires a unique cryptographic key for each client PED that can be traced to a trusted certificate authority (CA). These cryptographic keys may be stored on the media server. Each PED is assigned a device personality from the device provisioning server, and native app running on each PED retrieves the decryption keys using the assigned personality. The cryptographic keys are consumed, that is, once uniquely provisioned to a PED, it can no longer be used by another device at a different time. Thus, the more passengers use the IFE system, the more keys that are consumed.

Accordingly, new keys must be periodically loaded on to the media server so that passengers may continue to use the IFE system. One conventional method for such periodic loading of new keys involves the use of direct air-ground communications between the aircraft and a ground-based key server over a cellular model or a satellite communications module. Alternatively, the keys may be saved to a portable memory device that can be manually connected to the media server via a USB link between flights.

Other IFE systems may utilize alternative DRM platforms that require live connectivity from the aircraft to the ground for retrieving cryptographic keys. One such example is an IFE system offered by Lufthansa Technik, which utilizes the Microsoft ReadyPlay platform and requires each device to access a key server on the ground.

There are several deficiencies with existing cryptographic key loading methods. In the first instance, some aircraft may not have an operating air to ground communications modality. Furthermore, even when an aircraft has such capabilities, due to the high costs associated with per-data unit billing, it may not be economically viable to send consumable cryptographic keys over such networks. For example, a typical cryptographic key utilized in ExpressPlay implementations has a size of approximately 1 kilobyte, and so the bandwidth cost for delivering a key of this size would cost approximately ten times more than the cost of the key itself.

The aforementioned manual loading process is also problematic from several perspectives. Because human intervention is required, the costs can be substantial, particularly over an entire fleet of aircraft. Furthermore, being that such procedures are, by definition, not by demand, if the service is utilized more over a certain time period between manual loadings, it may not be available to the passengers because of the lack of available cryptographic keys. Along these lines, determining an appropriate number of cryptographic keys to load may be difficult, and oftentimes results in waste, as too many may be loaded. Each cryptographic key has an incremental cost, so each one that is not used during a given time period represents a lost opportunity cost.

Accordingly, there is a need in the art for an improved method for transferring consumable data such as cryptographic keys utilized for the playback of multimedia content on vehicles, in which persistent connections to a network resource are unavailable or cost-prohibitive.

BRIEF SUMMARY

The present disclosure contemplates methods and systems that take advantage of an existing periodic manual update cycle of multimedia entertainment content, to also delivery consumable cryptographic keys. The manual key transfer process, as an extra operation, is eliminated, and integrated into the content update procedure.

According to various embodiments of the present disclosure, one method is directed to transferring consumable data objects from a source server computer system to a vehicle server computer system. The method may include detecting availability of a first data communications link from the vehicle server computer system to the source server computer system. Additionally, the method may include generating a count of consumable data objects stored on the vehicle server computer system. If the first data communications link is detected, the method may include transmitting the count of the number of consumable data objects stored on the vehicle server computer system to the source server computer system. This transmission may take place over the first data communications link. Next, the method may proceed to deriving, on the source computer system, an identifier of the vehicle server computer system. The identifier may be derived from the first data communications link. The method may also include associating, on the source server computer system, the count of the number of consumable data objects stored on the vehicle server computer system with a derived identifier of the vehicle server computer system. There may also be a step of generating, on the source server computer system, a consumable data object replenishment count based upon an evaluation of the count of the number of consumable data objects stored on the vehicle server computer system. The evaluation may further consider historic use data derived from past counts of the number of consumable data objects stored on the vehicle server computer system.

Another embodiment contemplates a method for transferring consumable data from a loading computer device to a vehicle server computer system. The method may include establishing a data communications link from the loading computer device to the vehicle server computer system. Then, the method may proceed to a step of querying for a count of consumable data objects currently stored on the vehicle server computer system. Then, there may be a step of receiving, on the loading computer device, the count of consumable data objects stored on the vehicle server system in response to the query. Furthermore, the method may include deriving, on the loading computer device, a consumable data object replenishment count based upon an evaluation of the count of the number of consumable data objects stored on the vehicle server computer system. There may additionally be a step of transmitting, from the loading computer device to the vehicle server computer system over the data communications link, a predetermined number of consumable data objects that correspond to the consumable data object replenishment count.

According to another embodiment of the present disclosure, there is a loading device for transferring multimedia content and cryptographic keys to an entertainment system of a vehicle. The entertainment system may include a media server and a key server. Furthermore, the loading device may include a data processor, a data transfer physical interface that may be connectible to a corresponding data transfer physical interface of the entertainment system, and a data storage device that stores multimedia content and a plurality of the cryptographic keys. The loading device may include a media loading service implemented as a series of instructions executable by the data processor to transfer the multimedia content stored on the data storage device to the media server of the entertainment system. The loading device may also include a key loading service implemented as a series of instructions executable by the data processor to transfer one or more of the plurality of the cryptographic keys stored on the data storage device based upon a current key count value reported by the key server of the entertainment system. The current key count may correspond to a number of cryptographic keys available on the key server.

The various embodiments of the present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure is directed to the distribution of consumable data, and in particular, cryptographic keys consumed during individual playback of multimedia content on vehicle/in-flight entertainment systems. The detailed description set forth below in connection with the appended drawings is intended as a description of the presently preferred embodiments of the present disclosure, and is not intended to represent the only form in which it can be developed or utilized. The description sets forth the features of the content loader in connection with the illustrated embodiments. It is to be understood, however, that the same or equivalent functions may be accomplished by different embodiments that are also intended to be encompassed with the present disclosure. It is further understood that the use of relational terms such as first, second, and the like are used solely to distinguish one from another entity without necessarily requiring or implying any actual such order or relationship between such entities.

Figure 1:
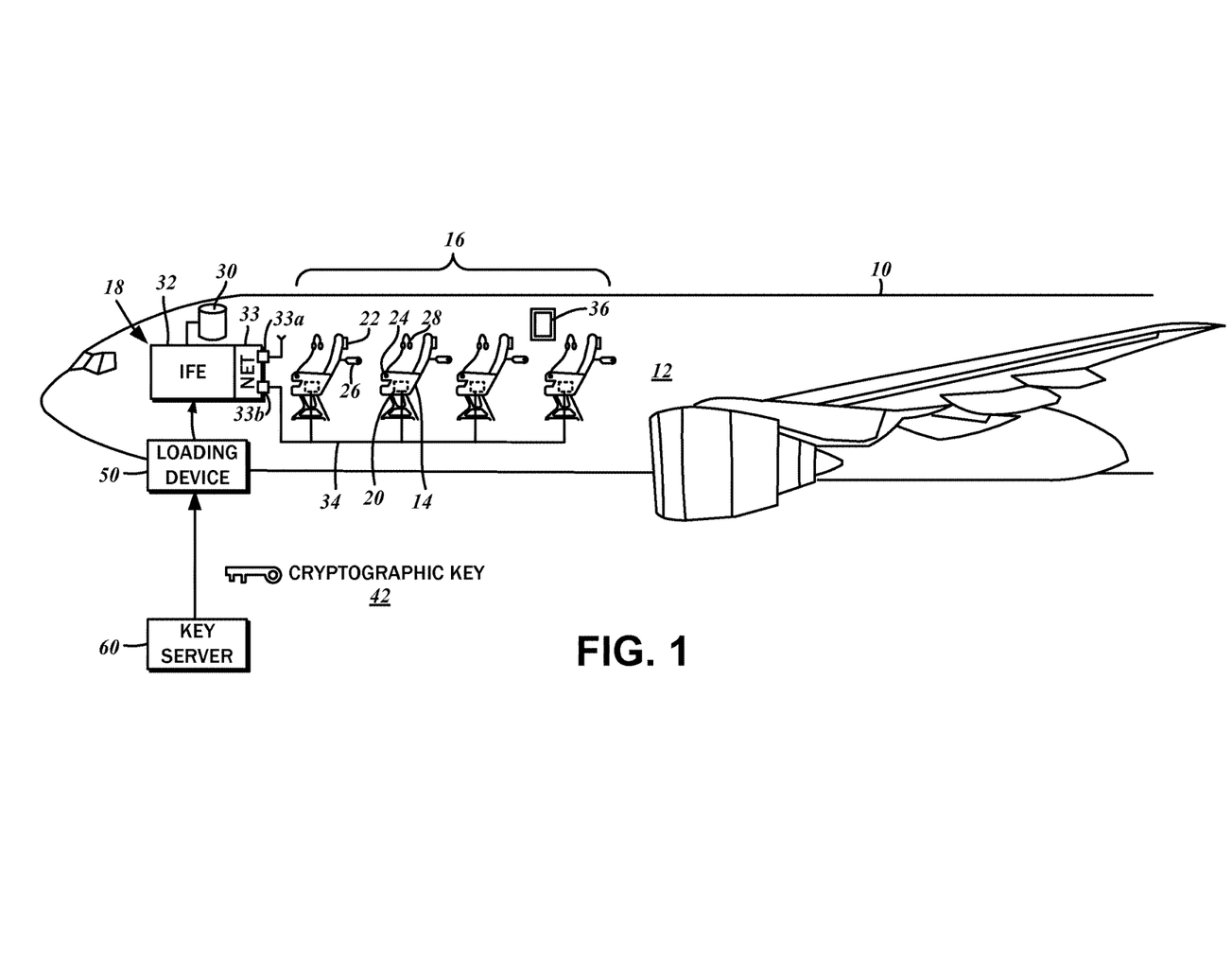
FIG. 1 is a diagram of one embodiment of a loading device in accordance with the present disclosure shown in the context of an aircraft in-flight entertainment system.

FIG. 1 is a simplified diagram of an aircraft 10, generally referred to herein as a vehicle, along with select subsystems and components thereof that are utilized in connection with the embodiments of the present disclosure. Within a fuselage 12 of the aircraft 10, there are seats 14 arranged over multiple rows 16, with each seat 14 accommodating a single passenger. Although the features of the present disclosure will be described in the context of the passenger aircraft 10 and amenities therefor, other passenger vehicles such as trains, watercraft, buses, and others incorporating entertainment systems for the enjoyment by passengers may be substituted.

In a typical configuration, each passenger is provided with an in-flight entertainment and communication (IFEC or IFE) unit 18, which is generally comprised of a terminal unit 20, a display 22, an audio output 24, and a remote controller 26. For a given row 16 of seats 14, the terminal unit 20 and the audio output 24 are disposed on the seat 14 for which it is provided, but the display 22 and the remote controller 26 may be disposed on the row 16 in front of the seat 14 to which it is provided. That is, the display 22 and the remote controller 26 are installed on the seatback of the row in front of the seat. It will be appreciated that this is by way of example only, and other display 22 and remote controller 26 mounting and access configurations such as a retractable arm or the like mounted to an armrest of the seat 14 may be employed on a bulkhead.

The display 22 is understood to be a conventional liquid crystal display (LCD) screen with a low profile that is suitable for installation on the seatback. Each passenger can utilize an individual headset 28, supplied by either the airline or by the passenger, which provides a more private listening experience. In the illustrated embodiment, the audio output 24 is a headphone jack that is a standard ring/tip/sleeve socket. The headphone jack may be disposed in proximity to the display 22 or on the armrest of the seat 14 as shown. The headphone jack may be an active type with noise canceling and including three sockets or a standard audio output without noise canceling. In alternate embodiments, each display 22 may incorporate a terminal unit 20 to form a display unit referred to in the art as a smart monitor.

As discussed earlier, the terminal unit 20 may be implemented with a general-purpose data processor that decodes the data files corresponding to the multimedia content and generate video and audio signals to the display 22 and the audio output 24, respectively. The multimedia content data files are stored in a repository 30 that is accessed by an in-flight entertainment system server 32. The terminal units 20 for each seat 14 may be connected to the in-flight entertainment system server 32 over a local area network 34, which may preferably be Ethernet. In this regard, the in-flight entertainment system server 32 includes a data communications module 33 with an Ethernet switch or router 33a. Thus, over the local area network 34, the terminal units 20 initiate a request for the multimedia content to the in-flight entertainment system server 32, which responds to such request by retrieving the requested multimedia content from the repository 30 and streaming it to the requesting terminal unit 20. There are a variety of ways in which the functionality of the in-flight entertainment system server 32 and the terminal units 20 may be implemented, and the foregoing is by way of example only.

Recent advancements in aircraft amenities also include wireless local area networks that can be utilized with passenger portable electronic devices (PED) 36. Thus, the data communications module 33 may further incorporate a WLAN access point 33b. For purposes of the present disclosure, PEDs refer to smart phones, tablet computers, laptop computers, and the like that have multimedia playback capabilities, along with data networking capabilities. Although these devices are most often brought on board the aircraft 10 by the passengers themselves, carriers may also offer them to the passengers for temporary use. The onboard wireless local area network may, in turn, be connected to an Internet downlink (via satellite or other modalities) so that PEDs can access the Internet during flight. Additionally, it is contemplated that the wireless local area networks can be used to access the in-flight entertainment system server 32, and the passenger can enjoy the multimedia content on their own PEDs 36.

The specifics of the multimedia content are not pertinent, though it is generally comprised of recently released movies, television shows such as news programs, comedy, documentaries, and informational content pertinent to the flight destination. Furthermore, multimedia content may also encompass audio-only programming, as well as interactive games, flight progress mapping, flight status displays, newspapers/magazines readable on the display 22, and so on. Broadly, multimedia content is intended to refer to any content of varying duration and form that can be presented to the passenger via the display 22 or the audio output 24, or a combination thereof.

As will be recognized by those having ordinary skill in the art, distribution or public performances of copyrighted content as contemplated in the context of in-flight entertainment, particularly where such content is being downloaded to passengers' PEDs 36, invoke concerns over unauthorized reproduction. In this regard, the content may be protected with Digital Rights Management (DRM) systems to eliminate, or at least minimize, the possibility of the content being reproduced in an unauthorized manner. One widely used DRM platform is Marlin, and various embodiments of the present disclosure implement the various rights management and content sharing features as defined under its specification. More particularly, the embodiments of the present disclosure may utilize the ExpressPlay hosted service offered by Intertrust Technologies Corporation.

Figure 2:
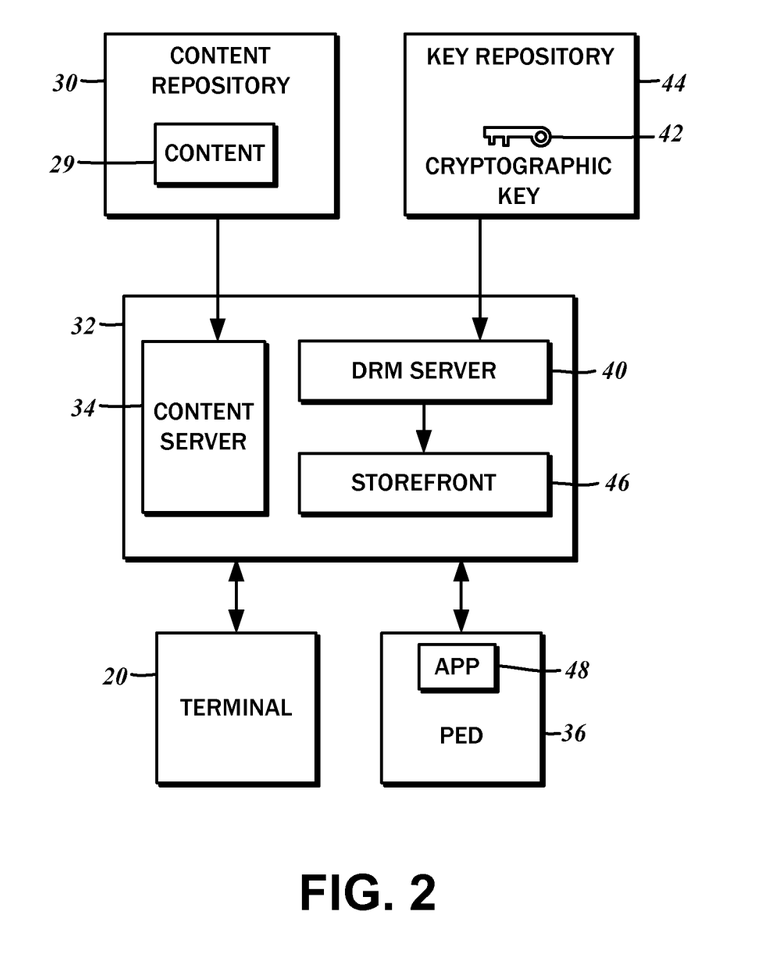
FIG. 2 is a block diagram of an exemplary in-flight entertainment system content purchasing architecture.

With reference to the block diagram of FIG. 2, one aspect of the in-flight entertainment system server 32 is a content server module 38 that may function to retrieve the multimedia content 29 from the repository 30, and transmit the same to the PED 36 or to the terminal unit 20 for presentation thereon. In some implementations, no restrictions may be imposed as to the content that is presented via the terminal unit 20, and so only the content that is downloaded to the PED 36 are subject to the following rights management scheme. However, it is also possible to implement the same rights management architecture with respect to the playback of content on aircraft built-in equipment. The in-flight entertainment system server 32 may further include a DRM service 40 that provides various rights management functions with respect to the content being offered through the in-flight entertainment system server 32 on one hand, and the various PEDs 36 consuming the content, on the other hand.

Generally, the multimedia content 29 is encrypted in storage in the repository 30 as well as during transmission to the PED 36, and decrypted on the PED 36 as it is being played back. Decryption requires a cryptographic key 42 that is stored in a key repository 44. The cryptographic key 42 is assigned to a specific device (either the particular terminal unit 20 or the PED 36), and only that device can utilize the cryptographic key 42 to decrypt the multimedia content 29. Once assigned, the cryptographic key 42 is not assignable to a different device, and in some embodiments, it may be used to decrypt the multimedia content 29 only once. In this sense, the cryptographic key 42 is understood to be consumable, and so it may be referred to as a consumable data object. The cryptographic key 42 utilized in ExpressPlay implementations are approximately a kilobyte in size, and must be generated by an ExpressPlay provider and purchased for use in connection with the in-flight entertainment system of the present disclosure. Presently, the cost of each cryptographic key for the ExpressPlay platform is approximately ten cents. The assignment and revocation of the cryptographic key 42 relative to each of the devices is understood to be handled by the DRM service 40.

The rights for the PED 36 to decrypt the multimedia content 29 for viewing may be predicated on purchasing the same. In other words, the viewer renders payment, and in exchange for that payment, the aforementioned cryptographic key 42 is provided. The purchase transaction may be handled by a storefront service 46 that may also be part of the in-flight entertainment system server 32. It will be appreciated by those having ordinary skill in the art that the foregoing specifics of the ExpressPlay implementation are provided by way of example only and not of limitation, and the present disclosure may be utilized in connection with other DRM platforms that may have an alternative configuration. Furthermore, certain elements of ExpressPlay implementations may be described at greater levels of generality than others, and so the specifics are not intended to be limiting.

So that the PED 36 can interact with the storefront service 46, it may be loaded with a dedicated application 48. Additionally, the application 48 is understood to include the cryptographic key management facilities so that the retrieved multimedia content 29 can be decrypted and displayed on the PED 36. With the ExpressPlay platform, the application 48 is understood to be available for multiple computing and mobile device platforms, including Android and iOS, as well as any computer with standard web browser applications.

Although the provision of the cryptographic key 42 has been described as contingent on payment for viewing a particular item of the multimedia content 29, this is by way of example only. Some embodiments contemplate a flat rate for all content available on the repository 30, and in other cases, payment may be eliminated altogether. It is understood that once purchased or otherwise authorized, playback of the multimedia content 29 on the PED 36 need not be limited to the duration of the flight, and it may be viewed at other times once the passenger disembarks.

Most carriers update the multimedia content 29 on a periodic basis. Referring again to the diagram of FIG. 1, such updates are stored in loading device 50 that can be brought on board between flights, and connected to the in-flight entertainment system server 32. While connected, the updates are transferred to the repository 30. As best illustrated in the block diagram of FIG. 3, the loading device 50 includes a general-purpose data processor 52 that can execute pre-programmed instructions to perform various functions as contemplated herein. Furthermore, the loading device 50 includes a data storage device 54 on which the aforementioned updates to the multimedia content 29 are stored. Another basic component of the loading device 50 is a data transfer physical interface 56 that is connectible to a corresponding data transfer physical interface of the in-flight entertainment system server 32. Typically, this will be a Universal Serial Bus (USB) port, though any other suitable local area, wired data transfer modality may be substituted without departing from the present disclosure. The basic hardware components of the loading device 50 have been described, though this is not intended as a comprehensive description of the other possible components that may be incorporated. Those having ordinary skill in the art will readily recognize such other components, and so they will not be described for the sake of brevity.

Figure 3:
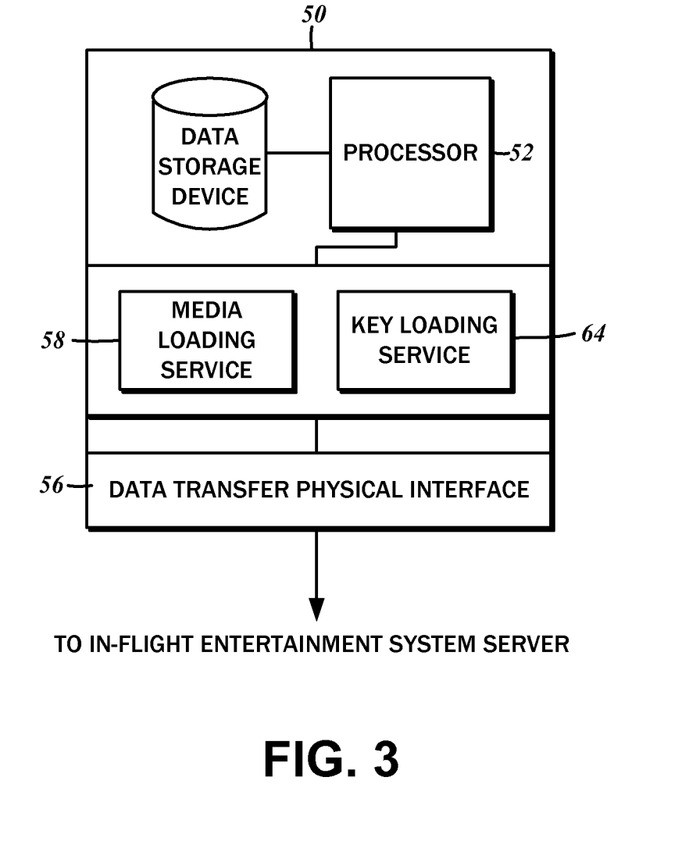
FIG. 3 is a detailed block diagram of the loading device showing a media loading service and a key loading service.

The functionality of establishing a persistent connection state to the content server module 38 and for carrying out the transfer of the multimedia content 29 from the loading device 50 may be provided by a media loading service 58. This may be implemented as a series of instructions executable by the data processor 52.

As indicated above, the cryptographic keys 42 are also consumed, that is, not available to others once it has been assigned to a particular device. Thus, in order for passengers to continue viewing the multimedia content 29, it is necessary for the in-flight entertainment system server 32 to have a ready supply of cryptographic keys 42. In aircraft 10 equipped with Internet connectivity that is available during flight, the in-flight entertainment system server 32 need only connect to a remote, terrestrial key server 60 to request cryptographic keys 42 as needed by the passengers. Many aircraft 10, however, are not so equipped, so replenishment with new cryptographic keys is needed periodically. Furthermore, even where in-flight Internet access is possible, the cost of such connectivity may be prohibitive, particularly in comparison to the typical cost of ten cents for a data transfer over expensive uplinks such as Iridium that may cost over $1.00 to complete for a cryptographic key of approximately a kilobyte in size.

Accordingly, various embodiments of the present disclosure contemplate taking advantage of the existing content update process to also deliver the consumable cryptographic keys 42, thereby eliminating the separate key delivery procedure. Referring now to the flowchart of FIG. 3, one contemplated method for transferring the cryptographic key 42, i.e., consumable data objects, from the key server 60, i.e., the source server to the in-flight entertainment system server 32, will be described. Again, because the present disclosure is understood to encompass other transportation-related deployments, notwithstanding the references to the in-flight entertainment system, it may be more generally referred to as a vehicle server computer system.

Implementations of ExpressPlay may involve a central authoritative source for the cryptographic key 42, and the key server 60 is understood to be such a source. However, other DRM platforms may permit secondary authorities that have been permitted by the central authority to offer cryptographic keys 42. In either case, the key server 60 is understood to refer broadly to any computer system that is a source for the cryptographic keys 42 for consumption by the various media playback devices, and may also be referred to as a source server computer system. Further, while a single entity is depicted as being the key server 60, it is to be understood that such entity may include more than one server system, or may span a part of one system and part of another. For example, one of the steps of the method involves storing a count of the number of cryptographic keys 42 together with an identifier for the aircraft 10 from which the count was sent. The key server 60 is described as performing this functionality, but the ultimate source of an ExpressPlay cryptographic key may be an application-neutral vendor system removed from the contemplated in-flight entertainment system context. In such case, the system that is performing the step of storing the count and the identifier is deemed to be the key server, and not the general-purpose ExpressPlay key server.

The method is understood to be applicable to scenarios where an in-flight Internet link is available, albeit at high cost. Referring now to the flowchart of FIG. 4, the method begins with a step 100 of detecting the availability of a first data communications link from the in-flight entertainment system server 32 to the key server 60. In this context, the first data communications link is understood to refer to an Internet connection 62 from the aircraft to the key server 60. At least one part of this communications link may be a wireless satellite link. Independently of the detecting step, the method includes a step 102 of generating a count of consumable data objects, e.g., cryptographic keys 42 currently stored on the in-flight entertainment system server 32, and specifically the key repository 44.

Figure 4:
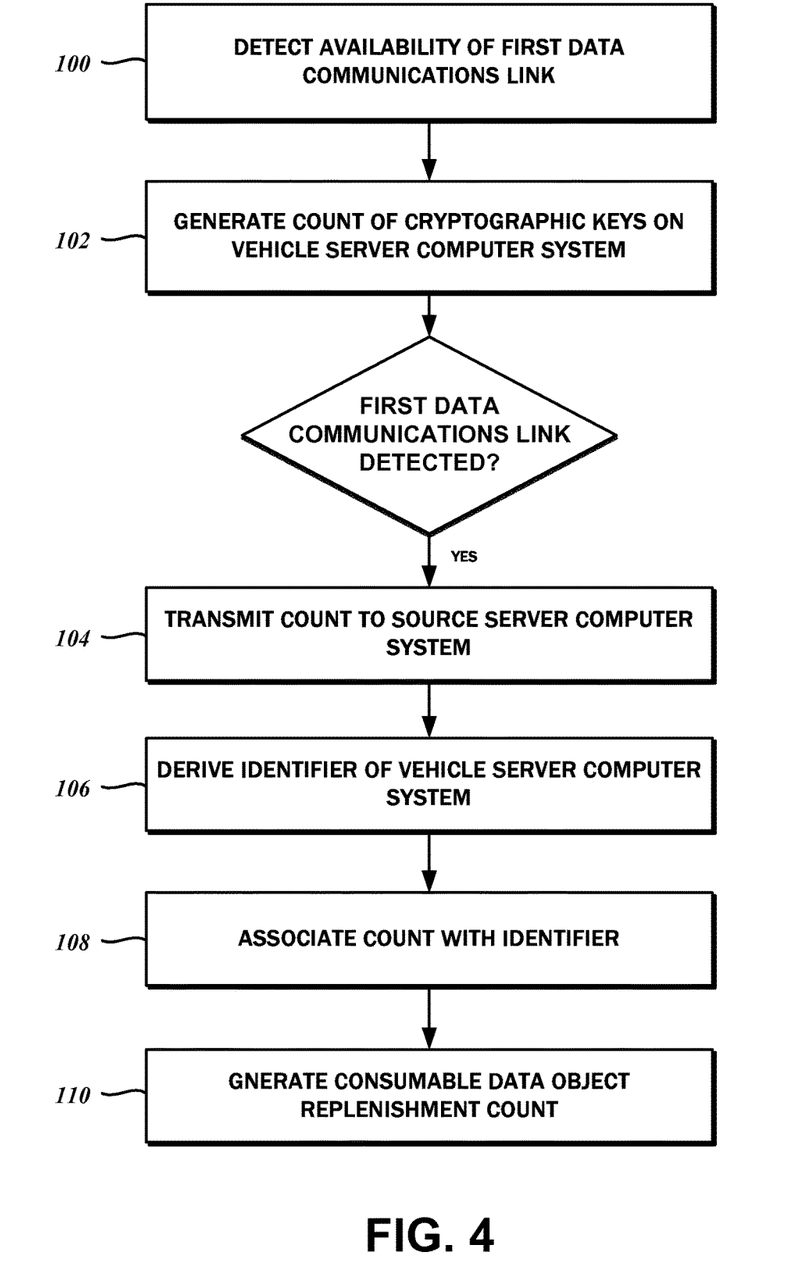
FIG. 4 is a flowchart illustrating one contemplated method for transferring consumable data objects from a source server computer system to a vehicle server computer system.

In a step 104, if the first data communications link is detected, the generated count of the number of available cryptographic keys 42 is transmitted to the key server 60. The count is understood be one or two bytes in size, so the costs associated with its transmission via the expensive Internet link is understood to be minimized.

From the identity of the transmissions originating from the in-flight entertainment system server 32, the particular aircraft 10 can be identified. It is possible for the transmission itself to incorporate a unique identifier of the aircraft, or some aspect of the transmission may otherwise uniquely identify the aircraft 10. Thus, in a step 106, an identifier of the specific in-flight entertainment system server 32 or the aircraft 10 may be derived on the key server 60.

The identifier for the aircraft 10 corresponding to the count is recorded or stored together with the received count, so that an appropriate number of cryptographic keys 42 may be transferred to the key repository 44 the next time that the loading device 50 is connected to the in-flight entertainment system server 32. In other words, per a step 108, the count of the number of cryptographic keys 42 stored on the in-flight entertainment system server 32 is associated with the derived identifier of the in-flight entertainment system server 32. The count is understood to be less than two bytes in size, and is therefore contemplated to be economical to transmit over an expensive satellite Internet communications link.

In a step 110, based upon the count data received from the aircraft 10, a replenishment count is generated. The replenishment count is then used to save the appropriate number of cryptographic keys 42 to the particular aircraft 10 as determined from the associated identifier. The generating of the replenishment count may consider historic use data that is derived from past counts. The analysis may be as simple as comparing the received count to a threshold value, e.g. a threshold of 100 keys is set, and when a count of 50 is returned, the replenishment count is set to 51. A more sophisticated analysis is also contemplated, e.g., previous flights of 4 hour durations resulted in the consumption of 50 keys, and with a future flight of the 4 hours being next, the replenishment amount is the anticipated consumption minus the count. Other calculations based on time of day, day of week, month, flight number, and so on may also be utilized in accordance with various embodiments of the present disclosure.

In an optional step not depicted in a flowchart, the method may also include transmitting a predetermined number of cryptographic keys 42 that correspond to the generated replenishment count to the loading device 50. Referring again to the block diagram of FIG. 2, the communication between the loading device 50 and the key server 60 may be handled by a key loading service 64 that is also implemented as a series of instructions executable by the data processor 52. More particularly, the key loading service 64 may establish communications with the key server 60, transmit a request for the cryptographic keys 42 for the designated aircraft 10, and receive the appropriate number of cryptographic keys that correspond to the aircraft as designated by the associated identifier.

Once the loading device 50 is supplied with the cryptographic keys, and once the aircraft 10 is on the ground (for service, layover, or otherwise), it may be connected to the in-flight entertainment system server 32 in the manner described above in relation to the content updates. The key loading service 64 of the loading device 50 similarly establishes a communication link with the in-flight entertainment system server 32, and transfers the cryptographic keys 42 following a confirmation process that ascertains the correct aircraft 10 and the correct number of cryptographic keys to replenish. With the specific number of needed cryptographic keys 42 being loaded, there is no wastage associated with an excess inventory on the in-flight entertainment system server 32. Furthermore, service outages during flight as a result of a deficient number of cryptographic keys 42 are avoided. The transfer of the cryptographic keys 42 is understood to occur substantially contemporaneously with the content updates, that is, the two types of data are transferred during the same session while the loading device 50 is connected to the in-flight entertainment system server 32.

An alternative embodiment contemplates eliminating the transmission of the count from an aircraft over an in-flight Internet connection, along with tracking the identifier for the aircraft throughout the process. A large number of cryptographic keys 42 may be stored on the loading device 50, and as the loading device 50 is connected to different aircraft 10, a count of available cryptographic keys 42 on the aircraft 10 to which the loading device is connected may be generated, and the corresponding key repository 44 may be replenished.

Figure 5:
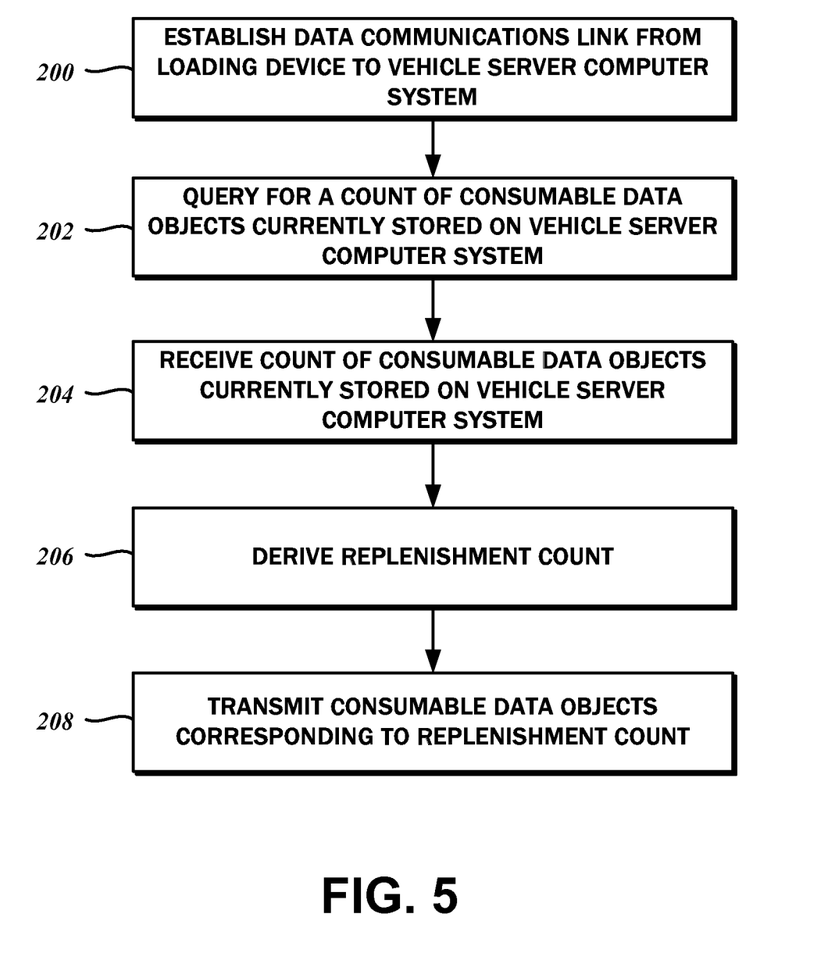
FIG. 5 is a flowchart illustrating another method for transferring consumable data objects from the source server computer system to the vehicle server computer system.

Referring now to the flowchart of FIG. 5, this alternative method begins with a step 200 of establishing a data communications link from the loading device 50 to the in-flight entertainment system server 32. Then, the in-flight entertainment system server 32, and specifically the key repository 44, is queried in accordance with a step 202 for a count of the number of cryptographic keys 42 currently stored in the key repository. Thereafter, in accordance with a step 204, the count of the number of cryptographic keys 42 is received, as per in response to the aforementioned query.

The loading device 50, and in particular, the key loading service 64 thereof, derives a replenishment count based upon an evaluation of the received count in accordance with a step 206. This step is effectively the same as step 110 described above, as performed by the key server 60. Again, the replenishment count may be generated from a simple threshold calculation, as well as more sophisticated historical analyses of the consumption of the cryptographic keys 42 on the aircraft 10.

From the pool of loaded cryptographic keys 42 stored on the loading device 50, the number of cryptographic keys 42 corresponding to the replenishment count are transferred to the in-flight entertainment system server 32 according to a step 208. Again, because the inventory of cryptographic keys stored on the in-flight entertainment system server 32 more closely tracks the actual usage, waste is minimized.

The particulars shown herein are by way of example and for purposes of illustrative discussion of the various embodiments of the present disclosure only and are presented in the cause of providing of what is believed to be the most useful and readily understood description of the principles and conceptual aspects thereof. In this regard, no attempt is made to show more details than are necessary for a fundamental understanding of the disclosure, the description taken with the drawings making apparent to those skilled in the art how the several forms of the presently disclosed systems and methods may be embodied in practice.

What is claimed is:

1. A method for transferring consumable data objects from a source server computer system to a vehicle server computer system, the method comprising:
    detecting availability of a first data communications link from the vehicle server computer system to the source server computer system;
    generating a count of consumable data objects stored on the vehicle server computer system, each consumable data object being assignable exclusively to a single device, with an assignment of a given one of the consumable data objects to the single device being irrevocable for assignment to other devices;
    if the first data communications link is detected, transmitting the count of the number of consumable data objects stored on the vehicle server computer system to the source server computer system over the first data communications link;
    deriving, on the source computer system, an identifier of the vehicle server computer system, the identifier being derived from the first data communications link; and
    associating, on the source server computer system, the count of the number of consumable data objects stored on the vehicle server computer system with a derived identifier of the vehicle server computer system; wherein the consumable data object is a cryptographic key.

2. The method of claim 1, further comprising:
    transmitting, from the source server computer system to a content loading device, a predetermined number of consumable data objects corresponding to the generated consumable data object replenishment count, each of the transmitted consumable data objects being associated with the derived identifier of the vehicle computer system.

3. The method of claim 2, further comprising:
    establishing a second data communications link from the content loading device to the vehicle server computer system;
    querying, from the content loading device, the identifier of the vehicle server computer system; and
    transmitting the consumable data objects stored on the content loading device with an associated identifier matching the identifier queried from the vehicle server computer system.

4. The method of claim 3, wherein the second data communications link is a physical link.

5. The method of claim 1, wherein at least a segment of the first data communications link is a wireless satellite link.

6. The method of claim 1, wherein: the one-time use cryptographic key is at least a kilobyte in size; and the count of the number of consumable data objects stored on the vehicle server computer system is less than two bytes in size.

7. The method of claim 6, wherein the one-time use cryptographic key is used to decode multimedia content being presented to vehicle passengers.

8. The method of claim 7, further comprising:
    assigning the cryptographic key to a passenger electronic device;
    wherein the multimedia content is being played back on the passenger electronic device.

9. The method of claim 1, further comprising generating, on the source server computer system, a consumable data object replenishment count based upon an evaluation of the count of the number of consumable data objects stored on the vehicle server computer system and historic use data derived from past counts of the number of consumable data objects stored on the vehicle server computer system.

10. A method for transferring consumable data from a loading computer device to a vehicle server computer system, the method comprising:
    establishing a data communications link from the loading computer device to the vehicle server computer system;
    querying for a count of consumable data objects currently stored on the vehicle server computer system;
    receiving, on the loading computer device, the count of consumable data objects stored on the vehicle server system in response to the query;
    deriving, on the loading computer device, a consumable data object replenishment count based upon an evaluation of the count of the number of consumable data objects stored on the vehicle server computer system; and
    transmitting, from the loading computer device to the vehicle server computer system over the data communications link, a predetermined number of consumable data objects corresponding to the consumable data object replenishment count; wherein each consumable data object is a cryptographic key assignable exclusively to a single device, with an assignment of a given one of the consumable data objects to the single device being irrevocable for assignment to other devices.

11. The method of claim 10, further comprising:
transmitting a plurality of consumable data objects from a source server to the loading computer device prior to establishing the data communications link to the vehicle server computer system.

12. The method of claim 11, wherein a specific number of the plurality of consumable data objects transmitted to the loading computer is derived from a historic use data derived from past counts of a number of consumable data objects consumed on the vehicle server computer system.

13. The method of claim 10, wherein the consumable data object is a one-time use cryptographic key used to decode multimedia content being presented to vehicle passengers.

14. The method of claim 13, further comprising:
assigning the cryptographic key to a passenger electronic device;
wherein the multimedia content is being played back on the passenger electronic device.

15. The method of claim 13, further comprising:
assigning the cryptographic key to an entertainment system console connected to the vehicle server computer system;
wherein the multimedia content is being played back on the entertainment system console.

16. The method of claim 13, wherein the multimedia content is stored on the vehicle server computer system, the method further comprising:
transmitting the multimedia content from the loading computer device to the vehicle server computer system over the data communications link in a same transaction session as the transmitting of the consumable data objects from the loading computer device to the vehicle server computer system.

17. The method of claim 10, wherein the data communications link includes a physical wired link between the loading computer device and the vehicle server computer system.

18. A loading device for transferring multimedia content and cryptographic keys to an entertainment system of a vehicle including a media server and a key server, comprising:
a data processor;
a data transfer physical or wireless interface connectible to a corresponding data transfer interface of the entertainment system;
a data storage device that stores encrypted multimedia content and a plurality of the cryptographic keys, each of the cryptographic keys being assignable exclusively to a single device, with an assignment of a given one of the cryptographic keys to the single device being irrevocable for assignment to and use for decrypting the encrypted multimedia content by other devices;
a media loading service implemented as a series of instructions executable by the data processor to transfer the multimedia content stored on the data storage device to the media server of the entertainment system; and
a key loading service implemented as a series of instructions executable by the data processor to transfer one or more of the plurality of the cryptographic keys stored on the data storage device based upon a current key count value reported by the key server of the entertainment system, the current key count corresponding to a number of cryptographic keys available on the key server.

19. The loading device of claim 18, wherein the transfer of the multimedia content and the transfer of the one or more of the plurality of the cryptographic keys are executed in a same transaction session.

* * * * *